March 28, 1967 J. F. BUTTERFIELD 3,311,699

SUBJECTIVE COLOR SYSTEM

Filed Sept. 10, 1963 3 Sheets-Sheet 1

INVENTOR.
JAMES F. BUTTERFIELD
BY
Elliott & Pastoriza
ATTORNEYS

INVENTOR.
JAMES F. BUTTERFIELD
BY
*Elliott & Pastoriza*
ATTORNEYS

INVENTOR.
JAMES F. BUTTERFIELD
BY
Elliott & Pastoriza
ATTORNEYS 3,311,699

SUBJECTIVE COLOR SYSTEM

James F. Butterfield, Sherman Oaks, Calif., assignor, by mesne assignments, to The Battelle Development Corporation, a corporation of Delaware Filed Sept. 10, 1963, Ser. No. 307,976
56 Claims. (Cl. 178—5.2)

This invention relates generally to systems for producing subjective colors and more particularly, to novel methods and apparatuses for producing subjective color on black and white television sets corresponding to colors in a televised scene.

The production of subjective color was investigated by Benham who found that by whirling a disc having only black and white patterns thereon, some of the patterns would appear to the observer to be in color. Since the production of the color is wholly subjective, the repetition of a certain sequence of dark and light areas or lines is all that is necessary.

United States Patent No. 2,844,990 to J. Nagler et al. issued on July 29, 1958, sets forth an excellent description of the entire phenomena as well as certain embodiments making use of the phenomena to provide color pictures on black and white television sets. However, in the methods and apparatuses set forth in the Nagler patent, the subjective color is effected by a film in which successive frames include patterns formed such as by cross-hatching or other types of lines so that essentially the same principle provided by the Benham whirling disc is employed. Thus, if a scene is to be televised wherein a colored object appears, the pattern lines on the film must be limited to the particular colored portion in the scene in order that this colored portion will be reproduced as a subjective color. It is thus necessary to provide a special film in order to effect the desired transmission of signals which will result in the subjective color phenomenon at a black and white receiver. Colored objects and letters can only be portrayed crudely with spaced lines.

Bearing the foregoing in mind, it is a primary object of this invention to provide a superior system in which subjectve color corresponding to colors in a scene may be produced without the restrictions inherent in the prior art methods discussed above.

More particularly, it is an object to provide a method and apparatus for producing subjective colors of a scene in which the colors in the scene are employed to provide the desired contrasting dark and white areas necessary to produce the subjective colors to the end that providing any type of hatching or line structure at places corresponding to the color positions is avoided.

Another object of this invention is to provide a means for picking up, transmitting, receiving, and reproducing images in full color utilizing only black and white transmission means. With respect to film, no chemical modification is necessary and with respect to television, no electronic change is necessary. The viewer of a projection of black and white film or the viewer of a television picture on a black and white set can observe the scene in its original colors without the use of special glasses, viewing means, or any device or change whatsoever at the receiving end.

Another important object is to provide a means whereby the regular black and white television camera and transmitting equipment and regular black and white television sets can be employed to bring color television to the home without further cost to the viewer and at a minimum of cost to the transmitting station. The same object applies to industrial closed circuit television systems.

Another object is to provide a means for printing black and white movie film from color film or to enable the taking of black and white movies of a color scene in such a manner that the black and white film when later viewed by standard projection means results in colored pictures.

A further object of this invention is to provide improved subjective color methods and apparatuses.

Briefly, these and many other objects and advantages of this invention are attained by providing repetitively a given sequence in which light from a colored scene is interrupted in an intermittent manner during the given sequence. The sequence in question is made up of light which is first blocked then successively filtered to block only light from different colored portions in the scene respectively. Thus, by the use of special filters rather than hatched lines or other line patterns as characterized the Nagler system described in the above-mentioned patent, the colors themselves will serve to provide the necessary dark areas to result in the provision of subjective color. Towards this end, in both the method and apparatus, the filters constitute complements of the various colors to be reproduced such that when a given color is viewed through its complementary filter, it will appear dark and thus in essence corresponds to the dark hatch lines which are used in the Nagler system. Light from the other colors of which the filter is not a complement will pass through the filter to provide the desired light background area. The next successive filter will be the complement of another color so that different dark areas will be provided and this color will be subjectively reproduced. Preferably, three color filters are used successively, and in the preferred embodiment, these color filters constitute cyan, magenta and yellow filters. These color filters are known in the art as complementary filters inasmuch as they are complementary to the respective primary colors or color components of red, green and blue. The blocking of the light may be effected by an opaque area following the filters.

The foregoing described given sequence may be used to effect the transmission of colored images by black and white transmission means and enable the reproduction of such colored images on black and white television sets. Also, the same sequence may be employed in printing black and white movie film from colored movie film so that when the black and white movie film is projected, the subjective color phenomenon will operate to render the images in full color. Clearly, also, the sequence may be employed to record a color program on magnetic video tape as black and white gradations such that when the tape is played back and transmitted, even though only black and white transmission means are used and a black and white set is used at the receiving end, the images will appear in color.

A better understanding of both the method and various apparatuses in accordance with this invention will be had by now referring to examples thereof as illustrated in the accompanying drawings, in which.

Figure 1:
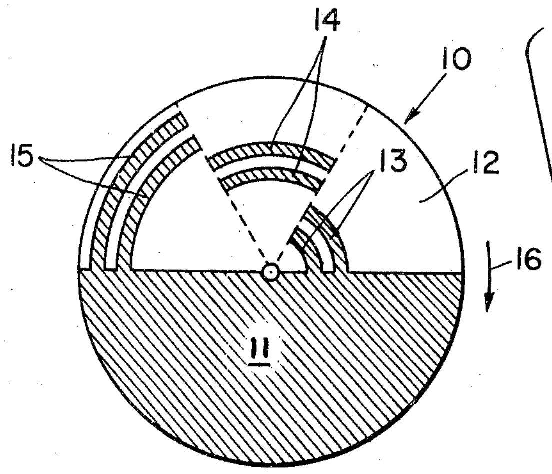
FIGURE 1 illustrates a typical Benham disc useful in explaining certain principles involved in the present invention.

Referring first to FIGURE 1, there is shown a typical Benham disc 10 which includes a black area 11 preferably covering substantially one half of the surface of the disc. The remaining half surface of the disc is white as indicated at 12 with the exception of arcuate black lines 13 over a first sector, similar arcuate lines 14 covering a portion of a second sector following the first sector, and arcuate black lines 15 in a third sector following the second sector. The sets of lines in the three white sectors are preferably successively radially spaced at increasing distances from the center of the disc as shown, there being provided surrounding white areas between the lines.

When the disc of FIGURE 1 is rotated slowly in the direction of the arrow 16, the arcuate black lines 13 will appear red, the lines 14 will appear green, and the lines 15 will appear blue. This subjective color phenomenon is believed to result from the particular sequence or successive action of black and white areas on the observer's eyes.

If the disc 10 were rotated in an opposite direction from the arrow 16, the lines 15 would appear red, the lines 14 green, and the lines 13 blue. It is thus evident that dark areas substantially following the major dark area 11 in the sequence of viewing will appear red, whereas dark areas preceded by a white area and followed by a white area such as the lines 14 will appear green whereas dark areas following a white area and then in turn followed by the major black area 11 will appear blue.

Figure 2:
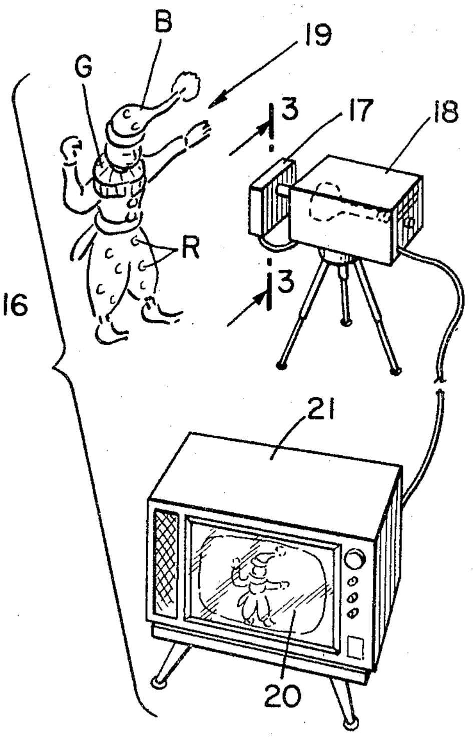
FIGURE 2 is a schematic perspective view of a black and white television camera and receiving set for producing colored images on the black and white set.

In accordance with one feature of the present invention, a disc incorporating the principles of the disc 10 may be located in front of a television camera and, rather than having arcuate lines such as indicated at 13, 14, and 15, suitable filters may be employed such that colors in a scene will appear as dark areas. Thus, referring to FIGURE 2, there is provided an optical disc means incorporated within a casing 17 positioned in front of the lens of a television camera 18. The device 17 will serve to control in an intermittant manner light received from a colored scene such as a clown 19. The sequence of successive picture frames transmitted to a home receiving set screen 20 of a black and white receiving set 21 will then provide a flickering pattern such that the scene will subjectively appear in color in the same manner that the lines 13, 14, and 15 of the rotating disc of FIGURE 1 appear in color.

Figures 3, 4, 5:
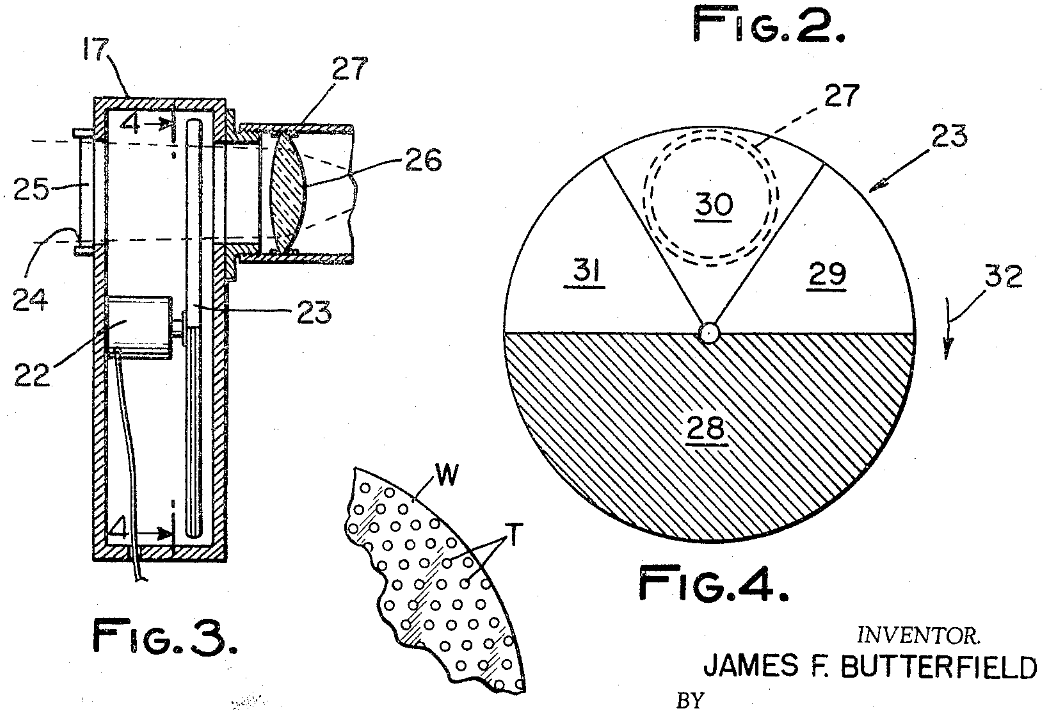
FIGURE 3 is a cross-section of one type of sequential means employed in the system of FIGURE 2 taken in the direction of the arrows 3—3 of FIGURE 2.
FIGURE 4 is a plan view of a disc employed in the structure of FIGURE 3 taken in the direction of the arrows 4—4 of FIGURE 3.
FIGURE 5 is a fragmentary view of a half-tone type screen.

The manner in which a rotating type disc may be employed for the foregoing purposes without incorporating specific arcuate lines or hatchings will be evident by refering to FIGURES 3 and 4. As shown in FIGURE 3, a motor 22 serves to rotate a disc 23 within the casing structure 17. Light from the scene such as the colored clown 19 of FIGURE 2 passes through a window 24 incorporating a filter 25 which is not necessary but may be provided to compensate for color temperature of the light incident upon the particular scene, and to compensate for the wavelength acuity curve of the television camera and the receiver. The light from the scene then passes through the disc 23 to the lens 26 in the lens barrel 27 of the television camera 18 of FIGURE 2.

In the front view of the disc illustrated in FIGURE 4, it will be noted that there is provided an opaque area 28 which corresponds to the black area 11 of the Benham disc of FIGURE 1. The white area on the other hand, is made up of three successive color filters 29, 30 and 31. These filters are respectively the complements of the particular primary colors red, green and blue to be subjectively reproduced. Thus, the filter 29 may constitute a cyan filter, for example, Kodak wratten filter No. 44A, the filter 30 may comprise a magenta filter, for example, Kodak wratten filter No. 32, and the filter 31 may constitute a yellow filter, for example, Kodak wratten filter No. 12.

In the operation of the apparatus described thus far, assume that the disc 23 is caused to rotate in the direction of the arrow 32 of FIGURE 4. Also assume, merely by way of example, that the dots R on the clown's costume are red. The red light from these dots will be blocked by the cyan filter 29 and will thus appear as dark or black areas in the white section of the disc 23 immediately following the major black area 28. Thus the rotation of the disc will cause these dark or black areas to appear red for the same reasons that the arcuate lines 13 of the disc of FIGURE 1 appear red when the disc is rotated.

Similarly, assuming that the collar portion G of the clown's costume is green, the light from this portion will be blocked by the magenta filter 30 and will thus appear as a dark area on this center portion of the disc. Since the center portion is followed and preceded by white or light areas, it will appear green when the disc is rotated.

Similarly, blue portions of the clown, such as the clown's cap B will appear dark or black through the filter 31 and since this dark or black area is preceded by a light sector area and followed by the major black area 28, it will subjectively appear blue for the same reasons that the lines 15 of the disc of FIGURE 1 appear blue.

From the foregoing, it will be evident that the essence of the instant method and apparatus of this invention constitutes the provision of complementary filters to convert colored light from the scene into dark areas in a light background in combination with a major dark or black area all caused to repeat in the established sequence by rotation of the disc so that the colors subjectively reproduced correspond to the original colors.

It should be understood that as a consequence of the complementary filters, only the particular color to which the filter is complementary will appear as dark, the other colors simply providing a light or white background corresponding to 12 in FIGURE 1. Colors at the scene that are not pure primaries but rather a mixture of the primaries appear as different tones of gray through two or more filters. The gray does not cause an intensive subjective color as compared to black and the mixture of two or more subjective colors causes the mixed colors of the scene to be reproduced at the receiver. Blacks in the scene appear black at the receiver since no light is transmitted in that area through any of the filters so the receiving screen 20 of FIGURE 2 remains black in that area. White in the scene appears white at the receiver since white will appear as white through all primary filters and therefore white is reproduced at the receiver.

The transparent half of the disc 23 of FIGURE 4 could be divided into a two color system. In this case, a red-orange and a blue-green filter would be used successively in the left and right halves respectively.

Since the subjective color phenomenon depends upon dark areas surrounded by white areas such as the white portions between the arcuate lines illustrated in the Benham disc of FIGURE 1, the optimum reproduction of color occurs when the scene is composed of a number of colors or colored and white and black areas. The colored areas should be small in size. Letters, for example, should be thin rather than thick. If the camera were directed at a red wall which filled the entire screen, the effect would be the same as if the entire first sector containing the lines 13 of the Benham disc in FIGURE 1 were black; that is, there would be no subjective red color created. However, to break up the large areas of one color, a half tone type screen can be used to add areas of white corresponding to the spaces between lines 13, 14 or 15, throughout the picture. The original colors of the scene are then broken up into small pieces surrounded by white. The red wall would then appear red at the receiver, though somewhat less saturated. The half-tone type screen must be used at a point where the picture is in focus. This point would be immediately in front of the object or on a ground glass screen within the lens system, or at the face of the television pick-up tube.

FIGURE 5 illustrates a fragmentary portion of such a half-tone type screen. This screen would be positioned in the pick-up tube and lens system and includes a translucent portion W to provide a white background with small transparent openings T through which the scene is viewed.

The natural movement of objects with large areas of colors such as a flag blowing in the breeze, will also aid in breaking up large areas of color.

Figure 6:
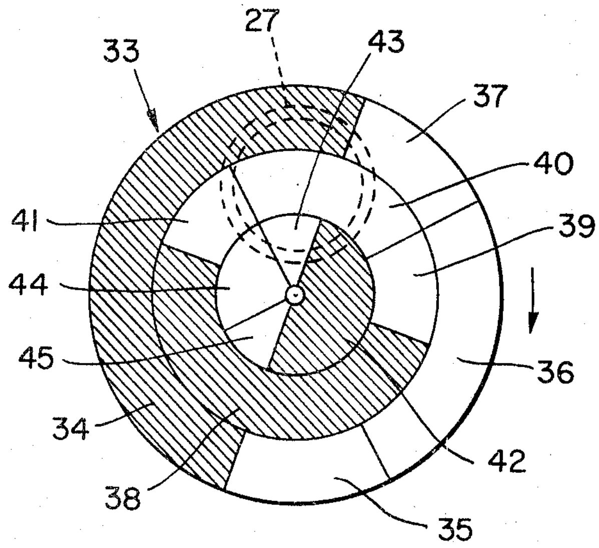
FIGURE 6 is a plan view of a modified disc structure.

The disc of FIGURE 4 may be rotated at a frequency of from 2 to 100 revolutions per second. The subjective color phenomenon is best produced when this frequency is towards the lower range, and as a consequence, there results a considerable flicker. However, it is possible to space this flicker across the field in such a fashion that its disagreeable aspects can be reduced. For example, FIGURE 6 illustrates a disc 33 in which parts of sections composing the black or opaque portions and filters form annular concentric areas. The parts of sections forming each of the areas are circumferentially displaced from the other annular areas so that the entire field is never rendered opaque at any one time. Thus, in the disc 33 of FIGURE 6, the outer annular area would include a major opaque or black area 34 followed sequentially by a sector part 35 which may comprise the cyan filter, a sector part 36 which may comprise the magenta filter, and a sector part 37 which may comprise the yellow filter. The intermediate concentric annular area would also include a major opaque or black area 38, cyan, magenta, and yellow filters 39, 40 and 41 and would be circumferentially displaced 90 degrees. Finally, the inner concentric annular area would include a black or opaque area 42 followed by cyan, magenta, and yellow filter 43, 44 and 45, this inner annular area being 90 degrees displaced from the intermediate annular area. Thus, the light passing into the lens barrel 27 depicted in dotted lines would at no time be completely blocked, thus the flicker would be distributed over the area of the screen. Although the example above describes only three concentric rings, it would be desirable to have a large number for minimum flicker. The displacement of the areas of the rings would be staggered across the picture. Such a disc would be located at a point where the picture is in focus.

Figure 7:
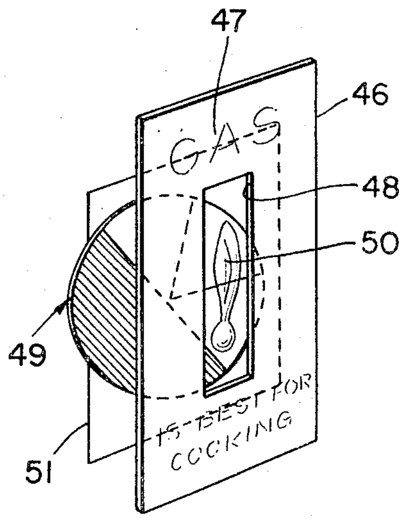
FIGURE 7 is a schematic perspective view illustrating a use of the disc structure for advertising purposes in commercial television programs.

FIGURE 7 illustrates one manner in which advantage may be taken of the principles discussed thus far in commercial television. In FIGURE 7 there is illustrated a card 46 having suitable advertising matter written thereon such as indicated at 47. The center of the card includes a cut-out window 48 behind which there may be provided a disc 49 corresponding to the disc of FIGURE 4. Behind the disc, in turn, is a color picture of a gas flame 50 on a slide 51. Alternatively, an actual flame may be positioned behind the disc 49.

If the disc 49 is now rotated, and the apparatus positioned in front of a television camera, the writing 47 and card 46 will appear in normal non-flickering black and white tones on a conventional black and white receiving set. However, the flame 50 will appear in full color and as a consequence of the flicker produced by the black area on the disc, the flame itself will appear to be flickering which will enhance its realism. Thus, the flicker inherent in producing the subjective colors can prove useful in commercial advertising. Flashing letters, pouring liquids and other moving effects can be created. Optical multiplexing, superimposing or electronic "keying" may be used to insert a flickering color area from a subjective color camera into a non-flickering monochrome picture from another camera.

Figure 8:
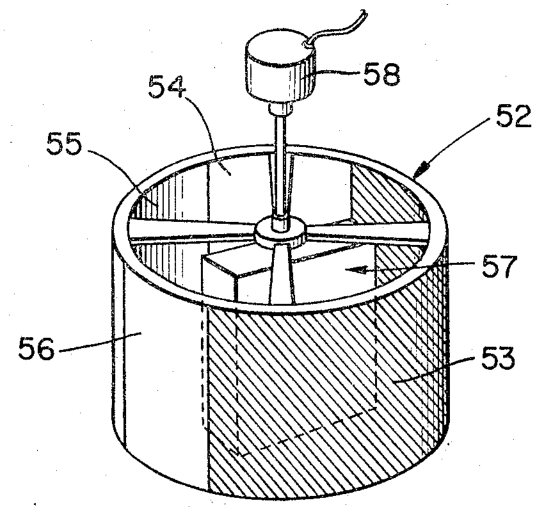
FIGURE 8 shows a modified sequential image producing means in the form of a rotating drum.

FIGURE 8 illustrates another sequential means for providing successive television picture signals resulting in the subjective color phenomenon. In this case, rather than a disc, there is provided a drum 52 having a large cylindrical surface portion 53 thereof opaque or black and the remaining cylindrical portions divided into cylindrical sections 54, 55 and 56 which may constitute cyan, magenta, and yellow filters. This entire drum may be rotated about a scene or object 57 so that light from the scene or object is blocked and then successively filtered to define the desired sequence. Alternatively, the drum could be placed over the TV camera or the light source. A motor 58 is provided for rotating the drum 52.

Figure 9:
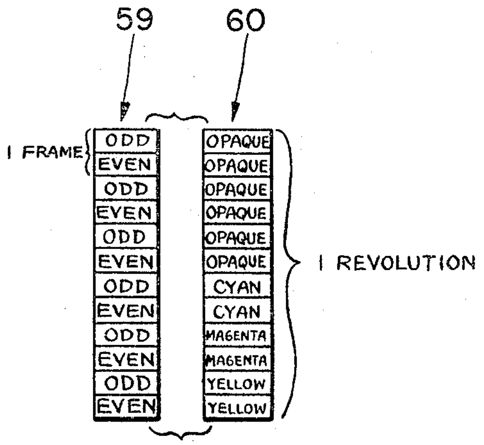
FIGURE 9 is a schematic drawing illustrating desirable synchronizing means between the television camera and sequential image forming means for the invention.

When using either a disc such as shown in FIGURES 4 and 6 or a drum such as shown in FIGURE 8, it is desirable to synchronize the rotation of the disc or drum with the scanning fields and frames of the television camera. Stated differently, it is desirable for the television camera to pick up successive pictures from the scene in a given sequence in which successive dark picture frames are received followed by succesive picture frames in which light from different colors in the scene to be subjectively reproduced is succesively filtered to appear dark. Thus, as indicated by the television fields 59 and disc sectors 60, in FIGURE 9 a single picture frame televised is made up of an odd field and an even field interlaced. There are many different combinations. In this example during six odd and even interlaced fields, an opaque or dark image will be provided by the revolving disc or drum. During the next frame of one odd and one even field, the cyan filter will be positioned in front of the image, during the succesive frame constituting an odd and even interlace, the magenta filter will be positioned in front of the image, and during the next succesive frame constituting an odd and even interlace, the yellow filter will be positioned in front of the picture as indicated by the correspondence between the frame pictures 59 and 60 of FIGURE 9. In this manner, each of the colors is covered by both an odd and an even scanning field and five revolutions per second of the disc equals 30 TV frames of 60 interlaced fields. Only one sector of the disc should be picked up by a television field at one time and a field should never pick up half of one sector and half of another sector. The disc then must be positioned at a point of focus, preferably between the pickup tube and lens.

Figure 10:
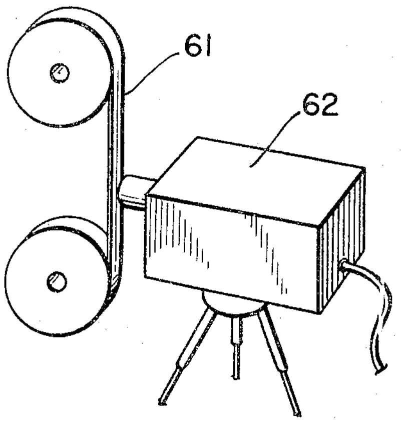
FIGURE 10 illustrates another manner of providing sequential images.

Rather than a rotating disc or drum, a simple film having succesive frames suitably following the given sequence of opaque and filtered portions may be used. FIGURE 10 illustrates such a film 61 positioned in front of a television camera 62.

Figure 11:
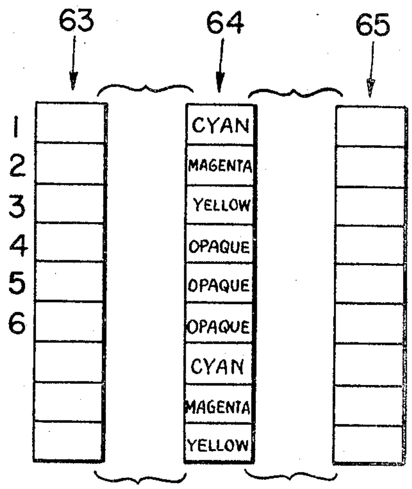
FIGURE 11 is a schematic illustration of a method for processing black and white film from color film such that subjective color images will result when the black and white film is viewed; and, FIGURE 12 is a schematic illustration of a modified type of television means for transmitting to a black and white receiving set sequential signals to provide color images.

FIGURE 11 illustrates a method of printing black and white movie film in such a manner that when the film is projected by a conventional projector, it will produce subjective colors when viewed on a screen. Towards this end, there is provided a color film 63 from which pictures are printed through a filter film 64 on to a black and white film 65. As shown, the succesive frames of the color film 63 numbered 1 through 6 are printed on the corresponding frames of the black and white film 65 through the filter film frames 64, which frames include in this example succesively cyan, magenta, and yellow filters followed by three opaque frames. The given sequence is then repeated until all of the frames in the black and white film and color film have been covered.

When the black and white film 65 is now projected, there will result the various dark areas corresponding to the desired colors to be reproduced following sequentially the black areas produced by the opaque portions of the film in the proper order so that the subjective color phenomenon results.

With the black and white film 65 printed in this manner, it may be shown in a television station and televised by a conventional television camera film chain and the motion picture resulting on the black and white television screen in a person's home will then subjectively appear in color.

Figure 12:
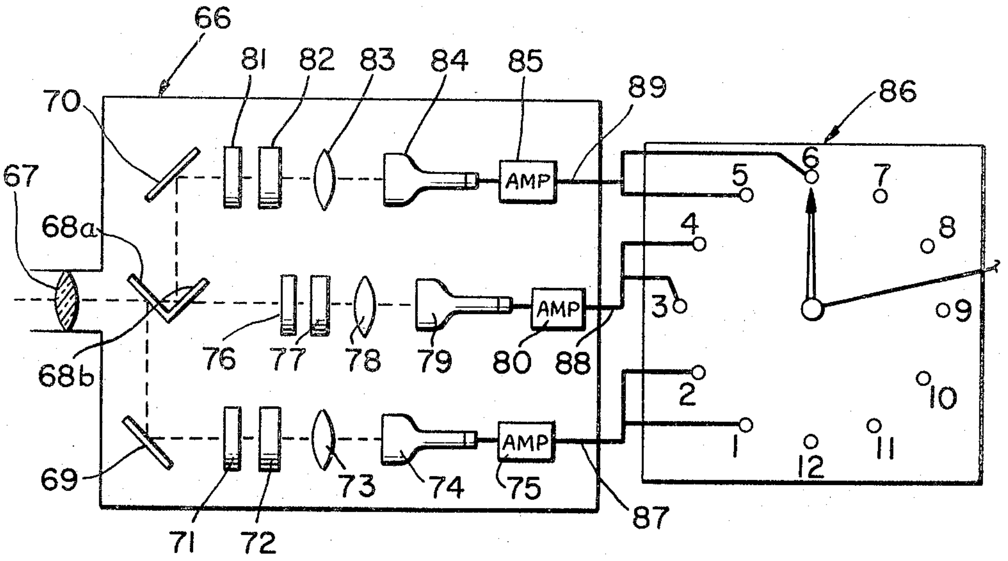

FIGURE 12 shows an alternative television camera means 66 for providing a desired signal picture sequence for producing subjective color on black and white television sets. Thus, rather than a rotating disc, drum, or moving film, the camera relay lens 67 picks up the color scene directly and divides the image into three pictures for three distinct television tubes. Towards this end, the image passing through the lens 67 is directed into a V array of dichoric mirrors **68*a* and 68*b* forming the center mirror and onto mirrors 69 and 70. The light is thus channeled in three directions as indicated by the dashed lines. The light from the mirror 69 is passed through a cyan filter 71, neutral density trimmer filter 72, primary lens 73, first television pick-up tube 74, the output signal from which is amplified in an amplifier 75. The light passing through the mirror sections 68*a* and 68*b* passes through a magenta filter 76, neutral density filter 77, primary lens 78, second television pick-up tube 79, the output signal of which is passed to an amplifier 80. The light from the mirror 70 passes through a yellow filter 81, neutral density filter 82, primary lens 83, third television pick-up tube 84, the output signal of which is amplified in amplifier 85**.

A suitable electronic switching system which is mechanically illustrated at 86 is employed as a control means for providing the desired picture field and frame signal sequence to be transmitted to a black and white set. Towards this end, there is depicted a rotary type switch provided with 12 contacts spaced about in a circle and numbered 1 through 12 as shown. The contacts 1 and 2 are connected to an output lead 87 from the amplifier 75, the contacts 3 and 4 are connected together to an output lead 88 from the amplifier 80, and the contacts 5 and 6 are connected together to an output lead 89 from the amplifier 85. The remaining contacts produce an opaque picture and are illustrated open. A switch arm 90 is arranged to swing into successive engagement with the various contacts.

In operation of the television camera means of FIGURE 12, it will be apparent that with the switch arm 90 swinging in a clockwise direction, the screen will be black initially and no picture images will be transmitted since the contacts 7 through 12 are open. However, when the contacts 1 and then 2 are engaged, an odd and even field of light passed through the cyan filter are transmitted, when the switch arm 90 passes over the contacts 3 and then 4, two fields of light filtered by the magenta filter are provided and when the switch arm pases over the contacts 5 and then 6, two fields of light filtered by the yellow filter are provided. The switch arm 90 will then progress over the open terminals to provide the desired dark picture frames at the television receiving set. In this example, the arm rotates at 5 revolutions per second providing 30 TV frames or 60 fields per second.

From the foregoing description, it will thus be evident that the present invention has provided a greatly improved method and apparatus for providing colored pictures by the subjective color phenomenon. Various changes and modifications falling clearly within the scope and spirit of this invention will occur to those skilled in the art. The invention is therefore not to be thought of as limited to the specific examples set forth merely for illustrative purposes.

What is claimed is:

1. A method of modulating light for providing a subjective color reproduction of a multi-colored image by providing light in an intermittent manner in a sequence in accordance with the following steps blocking substantially all light from said image, successively blocking substantially all light from each one of three primary color components of said image in turn while passing substantially all light from other color components of said image, and repeating said steps to sustain subjective color corresponding to respective colors in said image.

2. A method of modulating light for providing a subjective color reproduction of a multi-colored image by providing light in an intermittent manner in a sequence in accordance with the following steps blocking substantially all light from said image, successively blocking substantially all light from respectively different color components of said image while passing light from other color components of said image by filtering with respective complementary filters, and repeating said steps to sustain subjective color corresponding to respective colors in said image.

3. A method as in claim 2 wherein said filters respectively constitute cyan, magenta and yellow.

4. A method as in claim 2 including positioning a screen having a multiplicity of transparent areas and a multiplicity of areas which appear white in the subjective color reproduction in the path of light from said image so that light passes through said transparent areas.

5. A method as in claim 2 including causing said subjective color reproduction to appear within an image.

6. The method of taking and reproducing information using equipment for transmitting and receiving black and white images, comprising modulating light signals representing a scene in a time sequence to individually separate red, green and blue color components therein one after another and causing each of said selected color components in turn to appear as substantially black against a substantially white background formed by the other color components in the scene, followed by blocking light signals from said scene, and repeating said time sequence to produce black and white images providing subjective color on a receiver screen.

7. The method of claim 6 wherein said images are reproduced on a portion only of the screen of said receiver thereby causing one portion of said screen to appear in subjective color and the remaining portion thereof to appear in black and white.

8. A method of modulating light for providing a subjective color reproduction of a colored scene by providing light from said scene in an intermittent manner in a sequence in accordance with the following steps blocking substantially all light from a red color component of said scene while passing light from adjacent portions of said scene, and passing light from said color component of said scene while passing light from adjacent portions to reproduce said color component in a corresponding red subjective color.

9. A method as in claim 8 wherein light is blocked from said color component of said scene by a filter which blocks red light.

10. A method as in claim 8 including blocking substantially all light from said scene, and repeating said steps in the stated order to sustain the red subjective color reproduction of said color component of said scene.

11. A method of modulating light for providing a subjective color reproduction of a colored scene by providing light from said scene in an intermittent manner in a sequence in accordance with the following steps
passing light from a green color component of said scene, and adajacent portions
blocking substantially all light from said color component of said scene while passing light from said adjacent portions of said scene, and
passing light from said color component of said scene while passing light from adjacent portions to reproduce said color component in a corresponding green subjective color.
12. A method as in claim 11 wherein
light is blocked from said color component of said scene by a filter which blocks green light.
13. A method as in claim 11 including
blocking substantially all light from said scene, and
repeating said steps in the stated order to sustain the green subjective color reproduction of said color component of said scene.
14. A method of modulating light for providing a subjective color reproduction of a colored scene by providing light from said scene in an intermittent manner in a sequence in accordance with the following steps
passing light from a blue color component portion of said scene, and adjacent portions, and
blocking substantially all light from said color component of said scene and passing light from said adjacent portions of said scene to reproduce said color component portion in a corresponding blue subjective color.
15. A method as in claim 14 wherein
light is blocked from said color component portion of said scene by a filter which blocks blue light.
16. A method as in claim 14 including
blocking substantially all light from said scene, and
repeating said steps in the stated order to sustain the blue subjective color reproduction of said color component of said scene.
17. A method of modulating light for providing subjective color reproductions of a multi-colored scene by providing light from said scene in an intermittent manner in the following sequences to subjectively reproduce the respective colors of red, green and blue
blocking substantially all light from a red color component of said scene while passing light from other color components of said scene, followed by passing light from said red color component and other color components of said scene,
passing light from a green color component and other color components of said scene, followed by blocking substantially all light from said green color component of said scene while passing light from other color components of said scene, followed by passing light from said green color of component and other color components of said scene, and
passing light from a blue color component and other color components of said scene, followed by blocking substantially all light from said blue color component of said scene while passing light from other colored components of said scene.
18. A method as in claim 17 including
blocking substantially all light from said red, green and blue color components of said scene, and
repeating the steps in the stated order to sustain the subjective color reproductions of said red, green and blue color components of said scene.
19. A method of modulating light for providing subjective two-color reproductions of a multi-colored scene by providing light from said scene in an intermittent manner in accordance with the following ordered sequence,
blocking substantially all light from a red-orange color component of said scene while passing light from a blue-green color component of said scene, and
blocking substantially all light from said blue-green color component of said scene while passing light from said red-orange color component of said scene.
20. A method as in claim 19 wherein
light from said red-orange color component of said scene is blocked by a blue-green filter and light from said blue-green color component of said scene is blocked by a red-orange filter.
21. A method as in claim 19 including
blocking substantially all light from said scene, and
repeating the steps in the stated order to sustain subjective color reproductions of said red-orange and blue-green color components of said scene.
22. A method as in claim 20 including
blocking substantially all light from said scene, and
repeating the steps in the stated order to sustain subjective color reproductions of said red-orange and blue-green color components of said scene.
23. A method of modulating light for providing subjective color reproductions of a multi-colored portion of a scene by providing light from said portion of said scene in an intermittent manner in a sequence in accordance with the following steps
blocking substantially all light from said portion of said scene,
successively blocking substantially all light from respectively different color components in said portion of said scene while passing substantially all light from other color components in said portion of said scene by filtering said different color components with respective complementary filters, and
repeating said steps to sustain subjective color corresponding to respective color components in said portion of said scene.
24. A method of modulating light for providing subjective color reproductions of a multi-colored scene by providing light from said scene in an intermittent manner in a sequence in accordance with the following steps
blocking substantially all light from said scene,
successively blocking substantially all light from respectively different colored portions of said scene while passing substantially all light from other colored portions of said scene with respective cyan, magenta and yellow filters, and
repeating said steps to sustain subjective color corresponding to respective colors in said scene.
25. A method of providing subjective color by producing a sequence of black and white images on a screen comprising the steps of
blocking images from appearing on said screen,
producing successive images on said screen having black portions corresponding to respectively different colors to be subjectively reproduced and having adjacent white portions by filtering said different colors with respective complementary filters, and
repeating said steps to sustain said subjective color.
26. A method of modulating light for providing subjective color substantially corresponding to the colors in a multicolored scene by providing light from said scene in accordance with the following steps
blocking substantially all light from said scene,
successively filtering light from said scene with complementary filters thereby blocking substantially all light from at least portions of respectively different colored portions of said scene while passing substantially all light from other colored portions of said scene, and
repeating said steps to sustain said subjective color.
27. A method of presenting images for providing subjective color representing a multi-colored object by presenting successive images of said object in black and white followed by blocking substantially all light from said object in accordance with the following steps
successively blocking substantially all light from respectively different color components of said object by respective complementary filters while passing substantially all light from other color components of said object to provide successive images in black and white, blocking substantially all light from said object, and repeating said steps to sustain said subjective color.

28. A method as in claim 27 wherein said filters constitute cyan, followed by magenta, and followed by yellow.

29. A method of modulating light for providing a subjective color reproduction of a multi-colored image in an otherwise black and white scene by providing light in an intermittent manner in a sequence in accordance with the following steps blocking substantially all light from said multi-colored image, successively blocking all light from respectively different color components of said multi-colored image while passing light from other color components of said multi-colored image by filtering said different color components with respective complementary filters, and repeating said steps to obtain subjective color corresponding to respective colors in said multi-colored image.

30. A method of modulating light for providing a subjective color reproduction of a multiplicity of colored images by providing light in an intermittent manner in a sequence for each colored image in accordance with the following steps, said sequences being temporarily displaced from each other, blocking substantially all light from each of said images successively blocking substantially all light from respectively different color components of each of said images while passing light from other color components of each of said images by filtering said different color components with respective complementary filters, and repeating said steps to sustain subjective color corresponding to respective colors in each of said images.

31. A method of modulating light for providing a subjective color reproduction of a multi-colored image by providing light in an intermittent manner in a sequence in accordance with the following steps blocking substantially all light from said image, blocking substantially all light from a first color component of said image by filtering with a cyan filter while passing light from other color components of said image, blocking substantially all light from a second color component of said image by filtering with a magenta filter while passing light from other color components of said image, blocking substantially all light from a third color component of said image by filtering with a yellow filter while passing light from other color components of said image, and repeating said steps to sustain subjective color corresponding to respective color components in said image.

32. A method of producing black and white images on a screen for providing subjective color reproductions of a scene comprising the steps of picking up and reproducing successive picture frames of light from said scene in a given sequence in which dark picture frames are followed by successive picture frames in which lights from different color components in said scene to be subjectively reproduced are successively filtered to appear dark and light, said dark frames being reproduced for a period corresponding to at least one complete picture frame and the succeeding frames being successively filtered by cyan, magenta, and yellow filters respectively, and said given sequence being repeated to provide said subjective color reproduction.

33. A method of reproducing information for providing subjective color corresponding to red, green and blue color components of a multi-colored scene using video transmitting and receiving equipment wherein light from said receiving equipment is modulated by signals received from said transmitting equipment in accordance with the following numbered steps (1) said light is provided in an intermittent manner in respective simultaneous sequences of (a) providing an image wherein a red color component of said scene appears as substantially black against a substantially white background formed by other color components in said scene, followed by providing an image wherein said red color component appears substantially white along with a substantially white background formed by other color components in said scene, (b) providing an image wherein a green color component and other color components of said scene appear substantially white, followed by providing an image wherein said green color component appears as substantially black against a substantially white background formed by other color components of said scene, followed by providing an image wherein said green colored component and other color components appear substantially white, (c) providing an image wherein a blue color component and other color components of said scene appear substantially white, followed by providing an image wherein said blue color component appears substantially black against a substantially white background formed by other color components in said scene, (2) subsequently causing said red, green and blue color components to appear as a substantially black image, and (3) repeating said numbered steps.

34. A method of reproducing information for providing subjective color corresponding to a red color component of a colored scene using video transmitting and receiving equipment wherein light from said receiving equipment is modulated by signals received from said transmitting equipment, said light being provided in an intermittent manner in a sequence in accordance with the following steps providing an image in which a red color component of said scene appears as substantially black against a substantially white background representing other color components of said scene, providing a substantially white image representing said red color component and other color components of said scene, causing said red color component and said other color components of said scene to appear substantially black, and repeating said steps in the stated order to sustain a subjective production of said red color component.

35. A method of reproducing information for providing subjective color corresponding to a green color component of a colored scene using video transmitting and receiving equipment wherein light from said receiving equipment is modulated by signals received from said transmitting equipment, said light being provided in an intermittent manner in a sequence in accordance with the following steps providing a substantially white image representing a green color component and other color components of said scene, providing an image in which said green color component of said scene appears as substantially black against a substantially white background representing other color components of said scene, providing a substantially white image representing said green color component and other color components of said scene, causing said green color component and said other color components of said scene to appear substantially black, and repeating said steps in the stated order to sustain a subjective production of said green color component.

36. A method of reproducing information for providing subjective color corresponding to a blue color component of a colored scene using video transmitting and receiving equipment wherein light from said receiving equipment is modulated by signals received from said transmitting equipment, said light being provided in an intermittent manner in a sequence in accordance with the following steps providing a substantially white image representing a blue color component and other color components of said scene, providing an image in which said blue color component of said scene appears as substantially black against a substantially white background representing other color components of said scene, causing said blue color component and said other color components of said scene to appear substantially black, and repeating said steps in the stated order to sustain a subjective production of said blue color component.

37. A method of reproducing information in subjective color through the use of information transmitting means and receiving means of an image picked up at a location remote from said receiving means comprising separating said image into plural components corresponding to the primary color components in said image and represented by respective plural electronic signals, and providing said electronic signals to said receiving means in a repetitive sequence of (1) successively blocking substantially all of said electronic signal representing each respective primary color component of said image in turn while passing substantially all of said electronic signals representing the remaining of said color components of said image and (2) blocking substantially all said electronic signals, and repeating said sequence to sustain subjective color corresponding to the color components in said image.

38. A method as in claim 37 wherein said image is separated into plural components by filtering said image with complementary filters.

39. A method of producing black and white motion picture film from colored motion picture film in which viewing of the black and white film will produce subjective color corresponding to colors in said color film, comprising the steps of: printing successive frames of said black and white film from corresponding frames in said color film in a sequence in which one or more successive frames on said black and white film are dark, and the next successive frames are printed by light respectively passed through a series of complementary filters which block and pass substantially all light from certain colors of said colored film, said given sequence being repeated until the frames comprising said black and white film have been printed.

40. An apparatus for producing subjective color on a black and white television receiver screen of an image picked up by a television camera wherein said image is separated into plural components corresponding to the primary color components in said image and represented by respective plural electronic signals comprising translating means for providing said electronic signals to said receiver in a repetitive sequence of (1) successively blocking substantially all of said electronic signal representing each respective primary color component of said image in turn while passing substantially all said electronic signals representing the remaining of said color components of said image, and (2) blocking substantially all said electronic signals, and for repeating said sequence to sustain subjective color corresponding to the color components in said image.

41. An apparatus as in claim 40 wherein said translating means includes complementary filters for separating said image into said plural components, and includes switching means for generating said respective plural electronic signals.

42. An apparatus for producing subjective color images of a scene on a black and white television screen comprising, in combination: television camera means for transmitting picture signals; filter means positionable in front of said television camera means; said filter means comprising complementary filter sections; and control means for causing the transmitting of picture signals from said television camera means in a repetitive sequence in which each sequence results in a dark image followed by successive picture images in which different color components in said scene to be subjectively reproduced are caused to appear dark and light respectively by said filter means.

43. An apparatus according to claim 42, including a half-tone type screen adapted to be positioned so that light from scenes from which said picture signals are derived pass therethrough.

44. An apparatus for producing subjective color images of a scene on a black and white television screen comprising, in combination television camera means for transmitting picture signals, said television camera means comprising a single television camera, filter means positionable in front of said television camera means, said filter means comprising a rotating member positioned in the optical path of said camera and including an opaque and plurality of complementary filter sections successively following each other circumferentially about said member, and control means for causing the transmitting of picture signals from said television camera means in a repetitive sequence in which each sequence results in a dark image followed by successive picture images in which different color components in said scene to be subjectively reproduced are caused to appear dark and light respectively by said filter means, said control means including a motor for rotating said member.

45. An apparatus according to claim 44, in which said plurality of filter sections comprise cyan, magenta and yellow filters respectively.

46. An apparatus according to claim 45, including synchronizing means connected between said control means and television camera means to synchronize rotation of said filter sections with television frames.

47. An apparatus for producing subjective color images of a scene on a black and white television screen comprising, in combination television camera means for transmitting picture signals, said television camera means comprising three individual television cameras, filter means positionable in front of said television camera means, said filter means comprising cyan, magenta, and yellow filters respectively positioned in optical systems of said cameras, and control means for causing the transmitting of picture signals from said television camera means in a repetitive sequence in which each sequence results in a dark image followed by successive picture images in which different color components in said scene to be subjectively reproduced are caused to appear dark and light respectively by said filter means, said control means comprising switching means for sequentially transmitting signals from each of said cameras to provide said picture images and for blocking transmissions from all of said cameras to provide said dark images.

48. An apparatus for producing subjective color corresponding to colors in a scene, comprising, in combination sequential means for successively blocking light from said scene and passing light from said scene with respectively different color components succesively being blocked and other color components being passed to define a given sequence, said sequential means comprising a member having successive portions comprising an opaque portion followed by two or more complementary filters, and means for repeating said given sequence comprising moving means for moving said member so that its successive portions intercept light from said scene.

49. An apparatus according to claim 48, in which said member comprises a disc, said successive portions constituting parts of sectors on said disc, and said moving mean rotating said disc.

50. An apparatus according to claim 49, in which said parts of sectors are distributed successively on said disc over multiple concentric annular areas such that the parts of sectors in the respective areas are circumferentially displaced from each other.

51. An apparatus according to claim 48, in which said member comprises a drum, said successive portions constituting cylindrical sections forming said drum, and said moving means rotating said drum.

52. An apparatus according to claim 48, in which said member comprises a film strip, said successive portions constituting successive frames on said film strip, said moving mean moving said film strip.

53. A color member for modulating light in a subjective color system comprising a plurality of segments, a minimum of one of said segments being opaque, and the remaining segments being substantially cyan, magenta and yellow filters.

54. A member as in claim 53 wherein said member includes four segments with one of said segments being opaque bounded by substantially cyan and yellow filter segments, said substantially magenta filter segment being between said substantially cyan and yellow filter segments.

55. A member as in claim 53 wherein said member includes said first plurality of segments and a second said plurality of segments around and angularly displaced with respect to said first plurality of segments.

56. A color member for modulating light in a subjective color system comprising a plurality of segments, a minimum of one of said segments being opaque, and the remaining segments being substantially blue-green and red-orange filters.

References Cited by the Examiner

UNITED STATES PATENTS

| | | | |
|---|---|---|---|
| 2,535,530 | 12/1950 | Clark et al. | 178—5.4 |
| 2,784,246 | 3/1957 | Hurford | 178—5.8 |
| 2,844,990 | 7/1958 | Nagler et al. | 178—5.2 |
| 3,123,666 | 3/1964 | Bailey | 178—5.2 |

DAVID G. REDINBAUGH, *Primary Examiner.*

J. A. O'BRIEN, *Assistant Examiner.*